US008577943B2

(12) United States Patent
Pollock

(10) Patent No.: US 8,577,943 B2
(45) Date of Patent: Nov. 5, 2013

(54) ALGORITHM FOR CREATING UNIQUE BINGO FACES

(75) Inventor: Gregory T. Pollock, Cleveland, OH (US)

(73) Assignee: Arrow International, Inc., Cleveland, OH (US)

( * ) Notice: Subject to any disclaimer, the term of this patent is extended or adjusted under 35 U.S.C. 154(b) by 1544 days.

(21) Appl. No.: 11/974,787

(22) Filed: Oct. 16, 2007

(65) Prior Publication Data

US 2009/0100118 A1 Apr. 16, 2009

(51) Int. Cl.
*G06F 7/58* (2006.01)

(52) U.S. Cl.
USPC .......... 708/250

(58) Field of Classification Search
USPC .......... 708/250–256
See application file for complete search history.

(56) References Cited

U.S. PATENT DOCUMENTS 4,601,239 A 7/1986 Sillars
4,624,462 A 11/1986 Itkis
4,882,688 A 11/1989 Kondziolka et al.
4,885,700 A 12/1989 Kondziolka et al.
5,043,887 A 8/1991 Richardson
5,072,381 A 12/1991 Richardson
5,588,913 A 12/1996 Hecht
5,624,119 A * 4/1997 Leake .......... 273/269
6,132,312 A 10/2000 Hecht
6,934,846 B2 8/2005 Szrek et al.

* cited by examiner

*Primary Examiner* — Tan V. Mai
(74) *Attorney, Agent, or Firm* — Fay Sharpe LLP

(57) ABSTRACT

A method and apparatus for generating a plurality of unique configurations of indicia is provided. A first set of indicia is provided, including a plurality of first groups of indicia. Then a second set of indicia is provided that has a plurality of second groups of indicia. The first set of indicia is then combined with the second set of indicia in a pairwise fashion, wherein a number of the first groups of indicia is relatively prime in relation to an number of the second groups of indicia.

18 Claims, 5 Drawing Sheets

| Number Combinations | | | Arrangements Used | | |
|---|---|---|---|---|---|
| $b_1$ | = | 3001 | $b_2$ | = | 113 |
| $i_1$ | = | 2999 | $i_2$ | = | 113 |
| $n_1$ | = | 1321 | $n_2$ | = | 23 |
| $g_1$ | = | 2971 | $g_2$ | = | 113 |
| $o_1$ | = | 2998 | $o_2$ | = | 113 |

Fig. 3

ALGORITHM FOR CREATING UNIQUE BINGO FACES

BACKGROUND

The present exemplary embodiment relates to the gaming arts. It finds particular application in conjunction with the creation of bingo faces, and will be described with particular reference thereto. However, it is to be appreciated that the present exemplary embodiment is also amenable to other like gaming applications where a plurality of numbers or other indicia need to be generated.

In the gaming industry, there are many games in which a player receives a set of random numbers and waits for winning numbers to be called, hoping that the winning numbers match their own numbers. Such games include Keno, lottery, Bingo, and others. In games such as these, non-repeating combinations of numbers, symbols, or other types of indicia have many practical applications. For example, it is often desirable to ensure that repeating number combinations do not occur, as it might lead to duplicate winners, decreasing the payout potential to any single individual. In these types of games, unique number sets or other gaming pieces can eliminate duplicate winners, minimize the occurrence of multiple winners, and add excitement to the game by eliminating players from seeing the same game pieces on different occasions.

Various methods exist to create and store unique combinations of numbers. For instance, some systems employ completely random number generation. In this type of system, the numbers are generated randomly, and the product is then compared to a host of already created similar combinations stored in a memory. If the randomly generated number combination already exists in the memory, then it is discarded as a duplicate, and the process is repeated.

Unfortunately, in this type of number generation scheme, development and storage of the non-repeating combinations can be a rather monumental task, given the vast quantity of combinations that are possible. Consider for instance, a Bingo face that consists of a 5×5 number array. The first column contains 5 numbers, selected from 1-15, in random order. The second, fourth, and fifth columns are similar, containing the numbers 16-30, 46-60, and 61-75, respectively. The third, or middle column contains four numbers selected from 31-45. The middle space in the third column contains a "free" space. Given this number arrangement scheme, there are over 111 quintillion ($1.11\times10^{17}$) unique combinations. Typically, storing a single bingo card face requires 12 bytes, requiring well over one-sextillion ($1\times10^{18}$) bytes to store all of the combinations. To put this in perspective, a typical computer hard drive holds about 100 gigabytes (100 billion bytes). Therefore, it would take over 13 million hard drives to hold the $1.11\times10^{17}$ number combinations. Additionally, as more and more bingo faces are stored, it takes longer and longer to compare new ones against the stored ones in order to check for uniqueness.

It is apparent that the storage of such vast amounts of unique bingo faces is prohibitive. Therefore, it is desirable to find an alternate means of efficiently creating large quantities of non-repeating bingo faces. The present application provides a new and improved method and apparatus that overcomes the above-referenced problems as well as others.

BRIEF DESCRIPTION

In accordance with one aspect, a method of generating a plurality of unique configurations of indicia is provided. The method includes providing a first set of indicia, including a plurality of first groups of indicia, providing a second set of indicia including a plurality of second groups of indicia, and combining the first set of indicia with the second set of indicia in a pairwise fashion. A number of the first groups of indicia is relatively prime in relation to a number of the second groups of indicia.

In accordance with another aspect, a method of generating a plurality of unique bingo faces is provided. The method includes selecting a first set of columns of numbers from a first finite plurality of available sets of columns of constituent numbers. Next, a second set of columns of numbers is selected from a second finite plurality of available sets of columns of constituent numbers. Then a third set of columns of numbers is selected from a third finite plurality of available sets of columns of constituent numbers. After the third set, a fourth set of columns of numbers is selected from a fourth finite plurality of available sets of columns of constituent numbers. Finally, a fifth set of columns of numbers is selected from a fifth finite plurality of available sets of columns. A number of the first, second, third, fourth, and fifth sets of columns of constituent numbers are relatively prime with respect to each other.

In accordance with another aspect, a controller in a printing device is provided. The controller includes a processor for running an algorithm that generates unique arrays of numbers from finite sets of numbers, wherein the algorithm combines at least two sets of elements that contain relatively prime numbers of elements in a pairwise manner. The controller also includes a memory element for storing the algorithm. The controller also includes a processing cache usable by the algorithm while the algorithm is running.

BRIEF DESCRIPTION OF THE DRAWINGS

FIG. 3 depicts an exemplary selection of relatively prime numbers;

DETAILED DESCRIPTION

Figure 1:
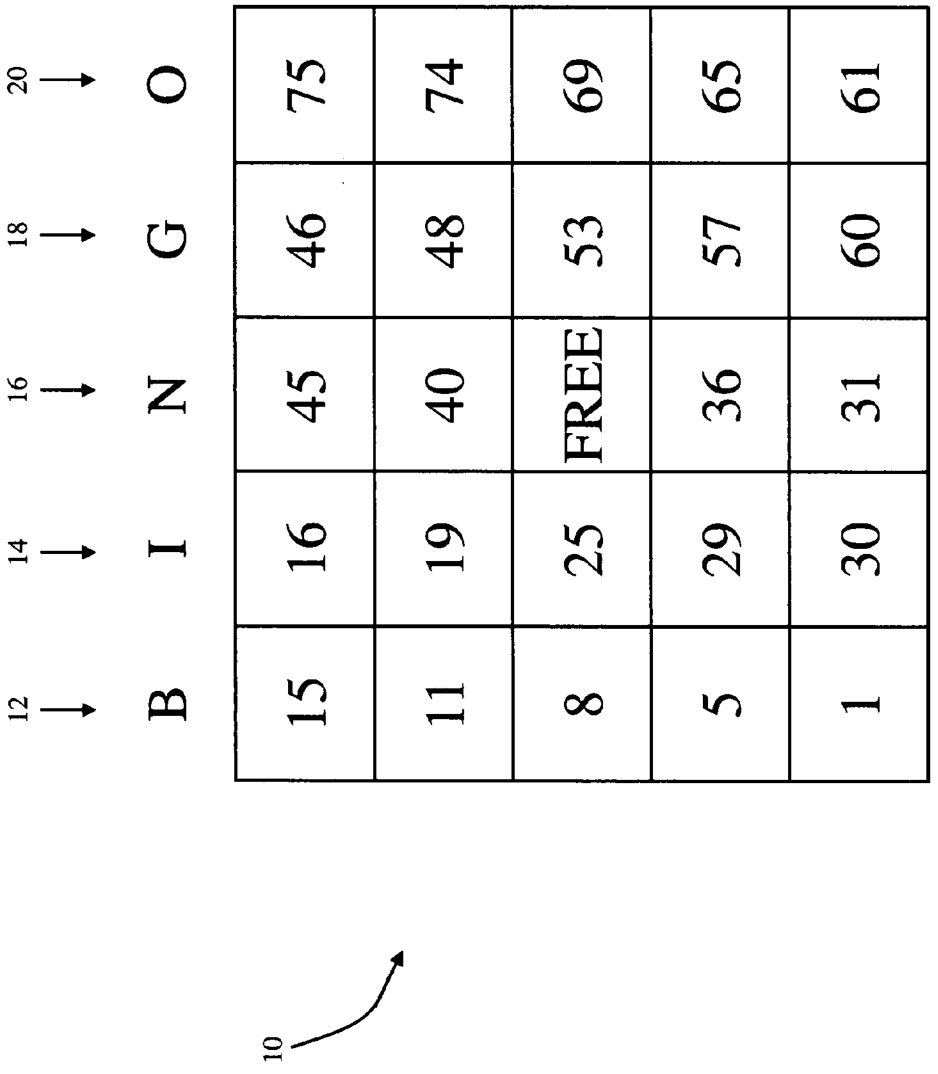
FIG. 1 is an exemplary representation of a bingo face.

With reference to FIG. 1, a typical bingo face 10 is constructed of five columns of 5 squares each. The face 10 has a "B" column 12, an "I" column 14, an "N" column 16, a "G" column 18, and an "O" column 20. Each column 12, 14, 16, 18, and 20 has a pool of 15 possible numbers. There are 3,003 possible unique combinations of non-repeating numbers for each column, except the "N" column. That column only has 1,365 possible combinations, since there are only four squares containing numbers. For example, for the "B" column, one possible unique combination can be 1-2-3-4-5, a second unique combination can be 1-2-3-4-6, and a third can be 11-12-13-14-15, and so on. Numbers are typically not duplicated on a bingo face. For each of these unique combinations of numbers, there are 120 unique ways that a set of 5 numbers can be arranged in any of the columns except column 16 (the N column), which has 24 unique possibilities of arranging four numbers. For example, 1-2-3-4-5 can also be arranged 5-4-3 2-1, 1-2-4-3-5, and so on. With these numbers in mind, the present application demonstrates a method of manipulating these numbers advantageously to produce a large number of unique bingo faces.

The present application utilizes the concept of relatively prime numbers. Prime numbers, of course, are positive integers that are evenly divisible only by themselves and the number (1). Two numbers (any two numbers, not necessarily prime) are relatively prime to each other if their only common factor is the number (1). Some examples are (3,4), (9,10), and (12,25). By definition, all prime numbers are relatively prime to all other prime numbers. Pairs of numbers, however, can still be relatively prime to each other even if one or both of them is not itself a prime number.

Figure 2:
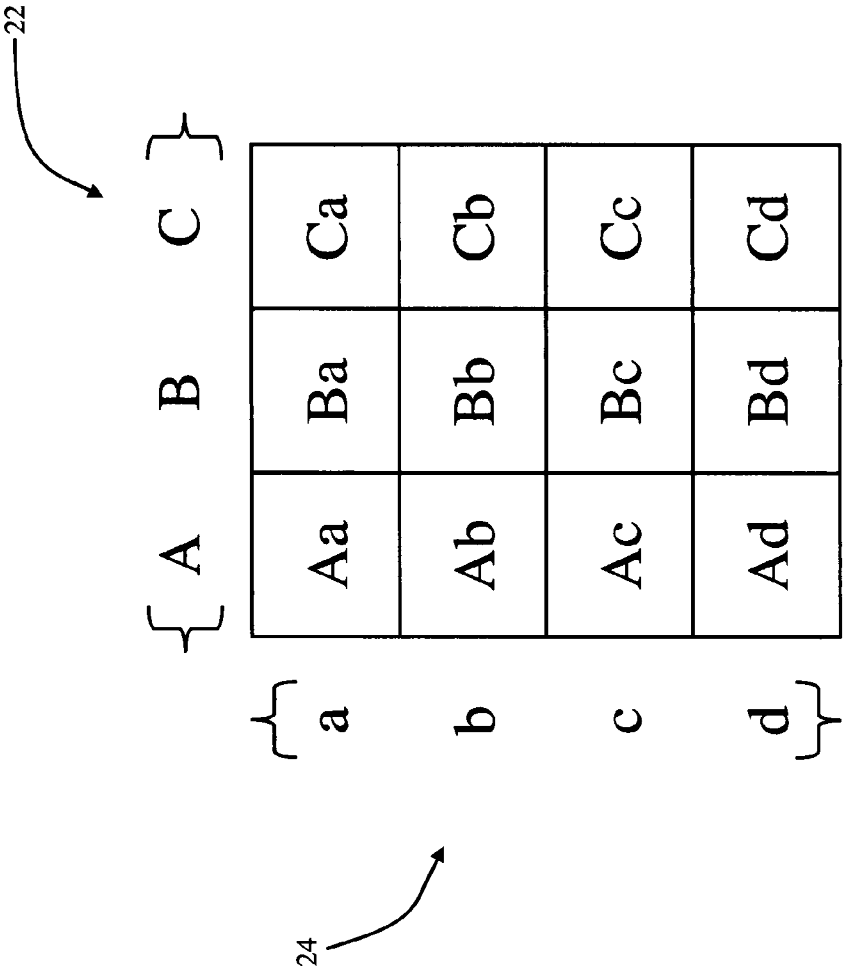
FIG. 2 is a chart showing pairwise combinations of two relatively prime numbers.

The concept of relatively prime numbers is useful in situations where there are two sets, and the number of elements in the sets are relatively prime. When this occurs, all unique combinations of elements of the two sets can be discovered by simple pairwise combination of the two sets. With reference to FIG. 2, an example of pairwise combination of relatively prime sets. Using the (3,4) example, a first set of three elements 22 {A, B, C} is arranged across the top, and a second set of elements 24 {a, b, c, d} is arranged down the side. All possible combinations of these two sets are shown in the matrix 26, after pairing the sets. Since the sizes of the two sets are relatively prime to each other, simple pairwise combinations of the two sets 22, 24 will yield all of the combinations without repetition. This basic concept will now be applied to the bingo face environment to produce an algorithm capable of producing a large number of bingo faces. The algorithm is able to be stored in a small amount of space in an electronic storage medium.

As mentioned above, there are 3,003 possible number combinations of each column, 12, 14, 18, 20 and 1,365 possible number combinations of column 16. Neither 3,003 or 1,365 are prime numbers. Also, they are not relatively prime to each other since they share the factors 3, 7, and 13. If these numbers were to be used in pairwise combinations, as in FIG. 2, there would be duplicate bingo faces created after 15,015 combinations. Resultantly, it is preferred that less than the maximum amount of permutations of each column be used.

As noted, there are 120 ways that each B, I, G, and O column can be arranged and there are 24 ways in which each N column can be arranged. Obviously, 120 and 24 are not prime numbers. Thus, less than the maximum amount of arrangements should be used, so that prime numbers are employed.

Let $b_1$, $i_1$, $g_1$, and $o_1$ be the used combinations chosen from the possible 3,003 "B", "I", "G", and "O" columns respectively, and let $n_1$ be the number of combinations chosen from the 1,365 "N" column possibilities. Similarly, let $b_2$, $i_2$, $g_2$, and $o_2$ be the used arrangements of the 120 possibilities for the "B", "I", "G", and "O" columns respectively, and let $n_2$ be the number of arrangements used for the 24 possibilities for the "N" column. If $b_1$, $i_1$, $n_1$, $g_1$, and $o_1$ are chosen so that they are relatively prime to each other, simple pairwise combinations of each of the B, I, N, G, and O combinations will result in a bingo face creation permutation where each face is unique and the number of faces produced before repetition will be maximized. Additionally, if $b_2$, $i_2$, $n_2$, $g_2$, and $o_2$ are also chosen so that they are relatively prime to the numbers of column possibilities, the number of faces before a row combination repeats in the exact same arrangement of numbers will also be maximized.

The preferred values chosen are depicted in FIG. 3. These values are the largest possible relatively prime numbers of unique columns. The numbers chosen for the B, I, N, G, and O columns are relatively prime to each other. The numbers are also chosen to be relatively prime with the numbers of arrangements chosen. 113 is the largest prime number that is less than 120 (115 is divisible by 5,117 is divisible by 3 and 119 is divisible by 7) and 23 is the largest prime number that is also less than 24. Both 113 and 23 are relatively prime to the numbers of columns chosen, as in FIG. 3. As a result, the output permutation will be able to produce 105,896,000,795, 776,000 ($1.05\ldots\times10^{17}$) unique bingo faces. This is 95.4% of all possible unique bingo faces. One advantage of this algorithm is that it can be stored in a relatively small amount of space, since only the columns and arrangements used need to be stored in order for the algorithm to operate. Therefore, this algorithm can be stored in less than 35,000 bytes, which is very small by present standards of the art. A small amount of additional memory is also required for the algorithm to operate.

Figure 4:
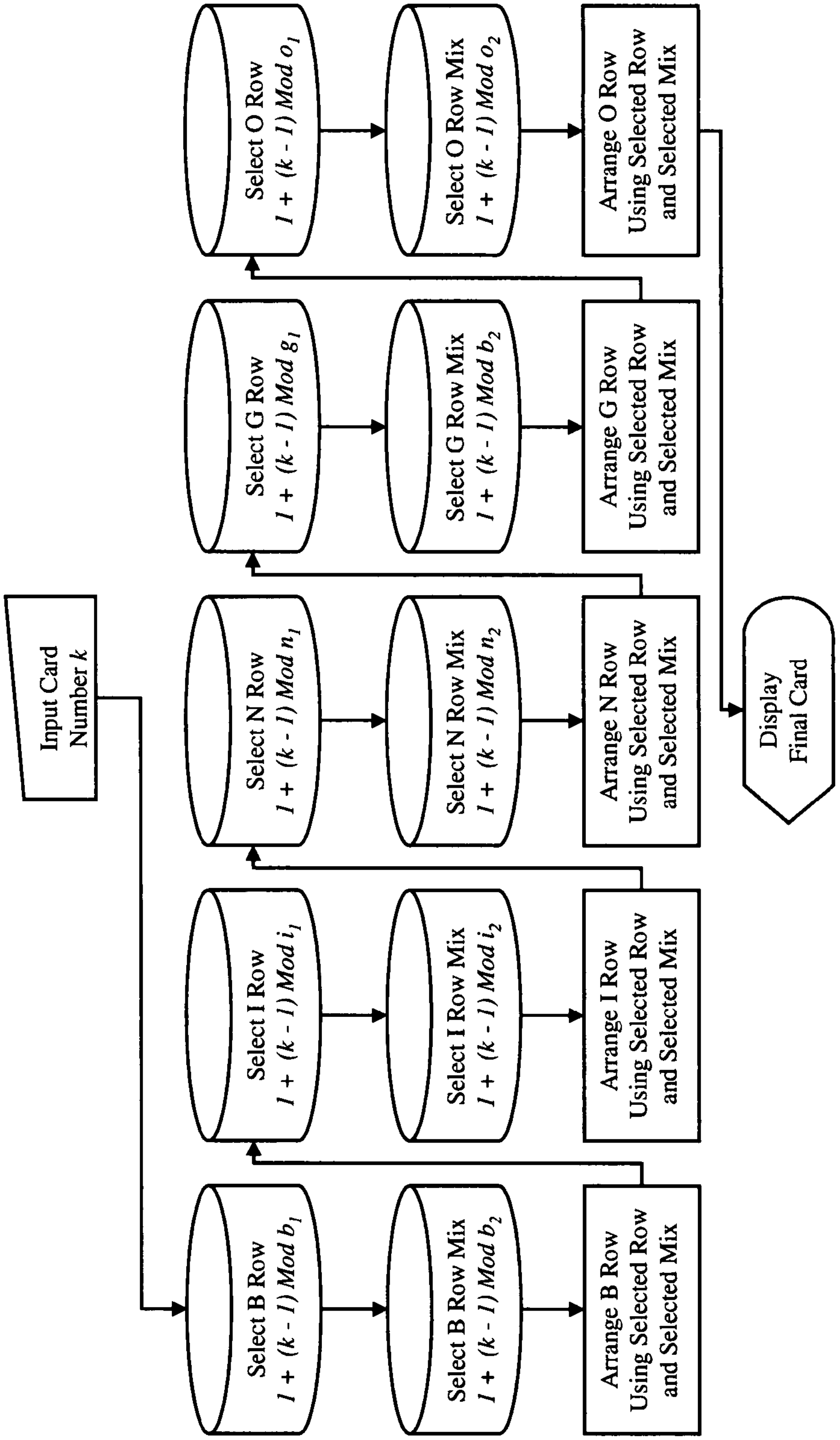
FIG. 4 is a flowchart tracking the creation of a bingo face by the algorithm.

Referring now to FIG. 4, a flowchart outlines the process that the algorithm performs when creating the bingo faces. As shown in FIG. 4, the algorithm chooses the numbers in the "B" Column 12 then chooses the arrangement of the column. After the "B" column 12 is arranged, the algorithm moves on to the "I" column 14, and so on, until a complete bingo face is produced. Then "k" is increased and the process is repeated, generating a new, unique bingo face.

By randomizing the B, I, N, G, and O columns prior to running the algorithm, increasing "k" by one will produce consecutive faces that are very different. Furthermore, the B, I, N, G, and O columns can be randomized in a way so that unique numbers appear on three consecutive faces or for all 75 numbers to appear at least one time on six consecutive faces. This can appeal to people who want to play multiple bingo faces simultaneously and wish to be kept busy daubing numbers for every call. The disclosed algorithm is also capable of producing specialty types of bingo faces, such as those sold by Arrow International, Inc. (Cleveland, Ohio) under the designations Red, White, and Blue, Spectrum, and Double Spectrum. Such bingo faces can be generated without additional memory space requirements. With a small amount of additional storage, the disclosed algorithm is capable of producing specialty bingo faces such as the Starburst, Big Burst, or Super Star faces, which contain an additional symbol or symbols that are printed over the traditional bingo number. A small amount of additional memory storage is required to store the location of the extra symbol on the bingo face. While the disclosed algorithm has been described in reference to bingo faces, it is also applicable to producing non-repeating pull-tabs or lottery tickets that have different combinations of indicia or symbols.

Figure 5:
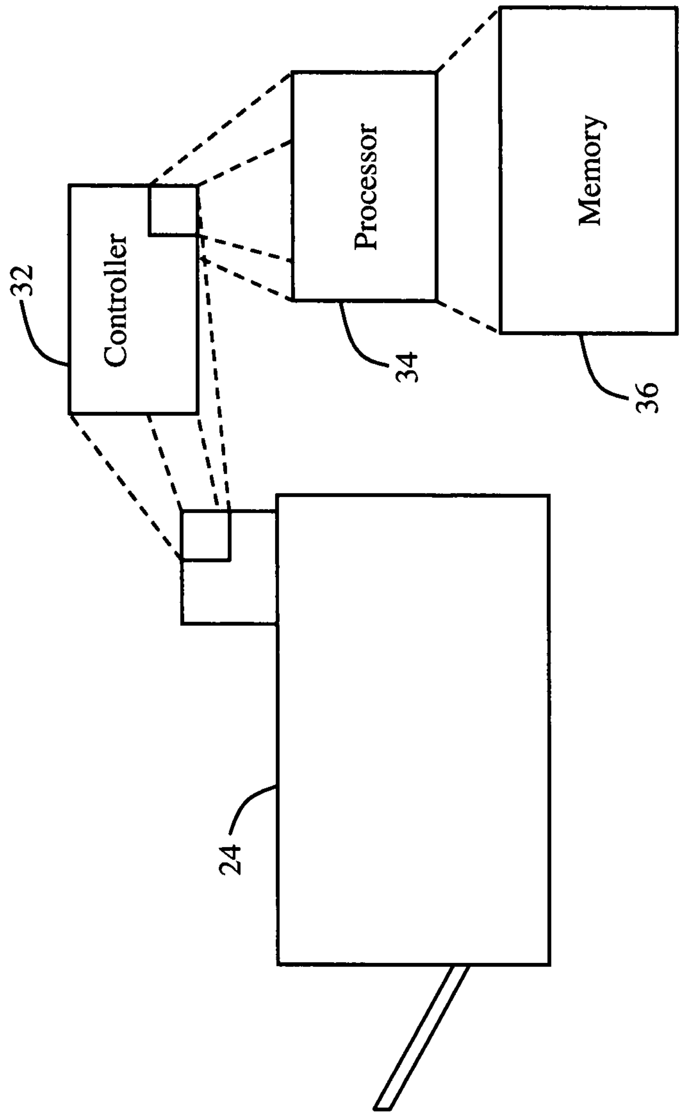
FIG. 5 depicts a printing device for executing the algorithm.

Because the disclosed algorithm is so compact, and with reference now to FIG. 5, it can be implemented to be run on a printer, such as a high speed laser printer. Examples of such printers include a Nipson press and Kodak's Seitek press. An exemplary printer 30 includes a controller 32, with a processor 34 and some amount of memory 36 sufficiently large to run the algorithm. A user inputs requests for numbers and types of faces at a user interface 38. When an order for bingo faces is submitted, the controller 32 requests a number of bingo faces. The processor 34 loads the algorithm into the memory 36 and processes as many bingo faces that have been requested. In this embodiment, the bingo faces are printed as they are generated, so there is no need to store the faces themselves, and the algorithm assures that only unique faces are generated. Alternatively, a conventional web press containing five separated bingo column belts could also be used to print the faces produced by the face generation permutation of the disclosed algorithm. In another embodiment, a print file is created on a computer that runs the algorithm. The computer then sends the print file to the print device. In this embodiment, the print device does not need to run the algorithm.

Due to the nature of the disclosed algorithm, a vast number of unique bingo faces are generated in a relatively simple and space efficient manner. Moreover, the time consuming duplicate bingo face checks need not be performed, due to the nature of the disclosed algorithm, which guarantees that they are unique. Additionally, because the disclosed algorithm generates unique faces, there is no longer a need to store individual bingo faces.

Disclosed has been a method and apparatus for creating vast amounts of unique arrays of numbers. More specifically, in one embodiment bingo faces are being produced. A processor runs an algorithm that creates the bingo faces. The algorithm uses the concept of relatively prime numbers to simplify the production and eliminate the storage of the arrays. Given two sets of elements, all combinations of those elements can be generated by simple pairwise combination of the elements, if each set contains a number of elements that is relatively prime to the other set. This ensures a simple method to execute that is capable of producing a huge quantity of unique arrays, while using only a small amount of storage or memory space.

The bingo face generating algorithm has been described with reference to the exemplary embodiments. Obviously, modifications and alterations will occur to others upon reading and understanding the preceding detailed description. It is intended that the disclosure be construed as including all such modifications and alterations insofar as they come within the scope of the appended claims or the equivalents thereof.

The invention claimed is:

1. A method of generating a plurality of unique configurations of indicia for use as bingo faces comprising:

providing a first set of indicia, including a plurality of first groups of indicia;

providing a second set of indicia including a plurality of second groups of indicia; and combining the first set of indicia with the second set of indicia in adjacent columns, wherein numbers of the first groups of indicia are relatively prime in relation and in a pairwise fashion to a number of the second groups of indicia, wherein the steps of providing indicia and combining occur in the memory of a processing device; and outputting the result of the combining step to a printing device.

2. The method as set forth in claim 1, further including:

providing a third set of indicia, including a plurality of third groups of indicia;

providing a fourth set of indicia, including a plurality of fourth groups of indicia;

providing a fifth set of indicia, including a plurality of fifth groups of indicia; and, combining the third, fourth, and fifth sets of indicia in a pairwise fashion with the first and second sets of indicia, numbers of the third, fourth, and fifth groups of indicia being relatively prime in relation to numbers of the first and second groups of indicia and to each other.

3. The method as set forth in claim 1, wherein two numbers are relatively prime to each other if their only common factor is the number one (1).

4. A method of generating a plurality of unique bingo faces in a memory of a processing device comprising:

selecting a first set of columns of numbers from a first finite plurality of available sets of columns of constituent numbers;

selecting a second set of columns of numbers from a second finite plurality of available sets of columns of constituent numbers;

selecting a third set of columns of numbers from a third finite plurality of available sets of columns of constituent numbers;

selecting a fourth set of columns of numbers from a fourth finite plurality of available sets of columns of constituent numbers;

selecting a fifth set of columns of numbers from a fifth finite plurality of available sets of columns, wherein numbers of the first, second, third, fourth, and fifth sets of columns of constituent numbers are relatively prime with respect to each other and combined in adjacent columns in a pairwise manner; and outputting the sets of columns to a printing device.

5. The method as set forth in claim 4, further including:

selecting an arrangement of the first columns of numbers from a first finite group of arrangements;

selecting an arrangement of the second column of numbers from a second finite group of arrangements;

selecting an arrangement of the third column of numbers from a third finite group of arrangements;

selecting an arrangement of the fourth column of numbers from a fourth group of arrangements; and, selecting an arrangement of the fifth column of numbers from a fifth finite group of arrangements, wherein a number of the arrangements of the first, second, third, fourth, and fifth sets of columns of constituent numbers are prime numbers.

6. The method as set forth in claim 5, wherein the first, second, third, fourth, and fifth sets of columns of numbers and the first, second, third, fourth, and fifth groups of arrangements are combined in a pairwise combination.

7. The method as set forth in claim 6, wherein the constituent numbers of the first set of columns range from one (1) to fifteen (15).

8. The method as set forth in claim 6, wherein the constituent numbers of the second set of columns range from sixteen (16) to thirty (30).

9. The method as set forth in claim 6, wherein the constituent numbers of the third set of columns range from thirty-one (31) to forty-five (45).

10. The method as set forth in claim 6, wherein the constituent numbers of the fourth set of columns range from forty-six (46) to sixty (60).

11. The method as set forth in claim 6, wherein the constituent numbers of the fifth set of columns range from sixty-one (61) to seventy-five (75).

12. The method as set forth in claim 6, further including: accepting requests from a user as to desired content of the bingo faces.

13. The method as set forth in claim 4, wherein two numbers are relatively prime to each other if their only common factor is the number one (1).

14. In a printing device, a controller comprising:

a processor for running an algorithm that generates unique arrays of numbers for a bingo card from finite sets of numbers, wherein the algorithm combines at least two sets of elements in adjacent columns that contain relatively prime numbers of elements in a pairwise manner;

a memory element for storing the algorithm; and, a processing cache usable by the algorithm while the algorithm is running.

15. The controller as set forth in claim 14, further comprising:

a user interface for receiving requests from a user as to at least one of a number and a type of number array.

16. The controller as set forth in claim 14, wherein the unique arrays of numbers are bingo faces.

17. The controller as set forth in claim 14, wherein the controller receives special orders for the numbers and types of bingo faces that the algorithm produces.

18. The controller as set forth in claim 14, wherein two numbers are relatively prime to each other if their only common factor is the number one (1).

* * * * *